United States Patent [19]

Teshima et al.

[11] Patent Number: 5,739,227

[45] Date of Patent: Apr. 14, 1998

[54] PROCESS FOR CONTROLLING MOLECULAR WEIGHT OF A STYRENIC POLYMER

[75] Inventors: Hideo Teshima, Sodegaura; Norio Tomotsu, Ichihara, both of Japan

[73] Assignee: Idemitsu Kosan Co., Ltd., Tokyo, Japan

[21] Appl. No.: 676,232

[22] PCT Filed: Nov. 27, 1995

[86] PCT No.: PCT/JP95/02403

§ 371 Date: Jul. 25, 1996

§ 102(e) Date: Jul. 25, 1996

[87] PCT Pub. No.: WO96/16993

PCT Pub. Date: Jun. 6, 1996

[30] Foreign Application Priority Data

Nov. 29, 1994 [JP] Japan .................. 6-294470

[51] Int. Cl.$^6$ .................. C08F 4/642; C08F 12/08
[52] U.S. Cl. .................. 526/153; 526/132; 526/133; 526/148; 526/151; 526/159; 526/160; 526/161; 526/347.2
[58] Field of Search .................. 526/159, 160, 526/132, 133, 148, 151, 153, 161

[56] References Cited

U.S. PATENT DOCUMENTS

| | | |
|---|---|---|
| 5,066,741 | 11/1991 | Campbell, Jr. .................. 526/160 X |
| 5,340,892 | 8/1994 | Kuramoto .................. 526/119 |
| 5,428,120 | 6/1995 | Newman et al. .................. 526/346 X |

FOREIGN PATENT DOCUMENTS

| | | |
|---|---|---|
| 4-298510 | 3/1992 | European Pat. Off. . |
| 5-97927 | 3/1992 | European Pat. Off. . |
| 4-314709 | 11/1992 | Japan . |
| 5-271337 | 10/1993 | Japan . |
| 5-295029 | 11/1993 | Japan . |
| 5-310834 | 11/1993 | Japan . |

*Primary Examiner*—Fred Teskin
*Attorney, Agent, or Firm*—Oblon, Spivak, McClelland, Maier & Neustadt, P.C.

[57] ABSTRACT

The present invention relates to a process for controlling molecular weight of a styrenic polymer by adding an organometallic compound such as triethylaluminum when a crystalline styrenic polymer having a highly syndiotactic configuration is produced by using a catalyst for producing a styrenic polymer having the syndiotactic configuration. A styrenic polymer having a highly syndiotactic configuration can efficiently be obtained by homopolymerizing or copolymerizing a styrenic compound in accordance with the process of the present invention. Therefore, the process of the present invention is expected to be advantageously used for producing the styrenic polymer.

8 Claims, No Drawings

PROCESS FOR CONTROLLING MOLECULAR WEIGHT OF A STYRENIC POLYMER

TECHNICAL FIELD

The present invention relates to a process for controlling molecular weight of a styrenic polymer. More particularly, the present invention relates to a process for efficiently controlling molecular weight of a styrenic polymer having the syndiotactic configuration.

BACKGROUND ART

Recently, production of a styrenic polymer having the syndiotactic configuration (referred to as SPS occasionally) with a considerably high yield has been enabled by polymerization of a styrenic monomer using a catalyst comprising a transition metal compound, particularly a titanium compound, and an alkylaluminoxane as the main components. However, when a polymer is produced by this process at a temperature of polymerization in such a range that the catalyst has a high activity, the produced polymer has a considerably high molecular weight, and development of a method for controlling the molecular weight of the produced polymer is required.

As the method for controlling the molecular weight, it was proposed that the molecular weight of the polymer could be decreased by increasing the temperature of polymerization.

However, the method of controlling the molecular weight by increasing the temperature of polymerization has drawbacks in that the catalyst activity is decreased to cause decrease in the productivity and increase in the production cost, and that the styrenic polymer having the atactic configuration is formed in an increasing amount to cause deterioration of the quality.

Therefore, it is desired to develop a process for controlling the molecular weight of the polymer which keeps decrease in the activity as small as possible at a temperature which does not cause formation of the styrenic polymer having the atactic configuration.

DISCLOSURE OF THE INVENTION

As the result of extensive investigations undertaken by the present inventors under the circumstances described above, it was discovered that, by adding an organometallic compound in the process for producing a styrenic polymer by using a transition metal compound, an aluminoxane or a coordinated complex compound composed of a cation and an anion in which a plurality of groups are connected to the metal, and an alkylating agent, the molecular weight of the formed styrenic polymer can efficiently be controlled. The present invention has been completed on the basis of the discovery.

Accordingly, the present invention provides a process for controlling molecular weight of a styrenic polymer comprising adding an organometallic compound in a process for producing a crystalline styrenic polymer having a highly syndiotactic configuration by using a catalyst for producing a styrenic polymer having the syndiotactic configuration.

THE MOST PREFERRED EMBODIMENT TO CARRY OUT THE INVENTION

In the process of the present invention, a styrenic monomer is polymerized by using a catalyst for producing a styrenic polymer having the syndiotactic configuration. As the catalyst for polymerization, various types of catalyst effective for producing SPS can be used. For example, a styrenic monomer is polymerized in the presence of a catalyst for polymerization which comprises (a) a transition metal compound, (b) a coordinated complex compound composed of a cation and an anion in which a plurality of groups are connected to a metal or an aluminoxane and/or (c) an alkylating agent.

As the transition metal compound of the component (a) used in the present invention, a compound represented by the following general formula (1) or (2):

wherein M represents a metal of Groups 3 to 6 of the Periodic Table or a metal of the lanthanoid series of the Periodic Table, $R^1$, $R^2$, $R^3$, and $R^4$ represent each an alkyl group, an alkoxy group, an aryl group, cyclopentadienyl group, an alkylthio group, a substituted cyclopentadienyl group, indenyl group, a substituted indenyl group, a fluorenyl group, a halogen atom, amino group, or a chelating agent, a, b, and c represent each an integer of 0 to 4, d and e represent each an integer of 0 to 3, and two groups selected from $R^1$ to $R^4$ may be crosslinked to each other through $CH_2$ or $Si(CH_3)_2$, is generally used.

As the metal of Groups 3 to 6 of the Periodic Table or the metal of the lanthanoid series of the Periodic Table represented by M, preferably a metal of Group 4, more preferably titanium, zirconium, or hafnium, is used.

As the titanium compound, various types of compound can be used. For example, at least one compound selected from titanium compounds and titanium chelate compounds represented by the following general formula (3) or (4):

wherein $R^5$, $R^6$, $R^7$, and $R^8$ represent each hydrogen atom, an alkyl group having 1 to 20 carbon atoms, an alkoxy group having 1 to 20 carbon atoms, an aryl group, an alkylaryl group, or an arylalkyl group having 6 to 20 carbon atoms, an acyloxy group having 1 to 20 carbon atoms, cyclopentadienyl group, a substituted cyclopentadienyl group, indenyl group, a substituted indenyl group, a fluorenyl group, an alkylthio group, an arylthio group, amino group, a chelating agent, or a halogen atom; a, b, and c represent each an integer of 0 to 4; d and e represent each an integer of 0 to 3; and two groups selected from $R^5$ to $R^8$ may be crosslinked to each other through $CH_2$ or $Si(CH_3)_2$, can be used.

$R^5$, $R^6$, $R^7$, and $R^8$ in the general formula (3) or (4) represent each hydrogen atom, an alkyl group having 1 to 20 carbon atoms (such as methyl group, ethyl group, propyl group, butyl group, amyl group, isoamyl group, isobutyl group, octyl group, and 2-ethylhexyl group), an alkoxy group having 1 to 20 carbon atoms (such as methoxy group, ethoxy group, propoxy group, butoxy group, amyloxy group, hexyloxy group, and 2-ethylhexyloxy group), an aryl group, an alkylaryl group, or an arylalkyl group having 6 to 20 carbon atoms (such as phenyl group, tolyl group, xylyl group, and benzyl group), an acyloxy group having 1 to 20 carbon atoms (such as heptadecylcarbonyloxy group), cyclopentadienyl group, a substituted cyclopentadienyl group (such as methylcyclopentadienyl group, 1,2-dimethylcylcopentadienyl group, pentamethylcyclopentadienyl group, and 4,5,6,7-tetrahydro-1,2,3-trimethylindenyl group), indenyl group, a substituted indenyl group (such as methylindenyl group, dimethylindenyl group, tetramethylindenyl group, and hexamethylindenyl group), a fluoreny group (methylfluorenyl group, dimethylfluorenyl group, tetramethylfluorenyl group, 1,2,3,4,5,6,7,8-octahydrofluorenyl group, and octamethylfluorenyl group), an alkylthio group (such as methylthio group, ethylthio group, butylthio group, amylthio group, isoamylthio group, isobutylthio group, octylthio group, and 2-ethylhexylthio group), an arylthio group (such as phenylthio group, p-methylphenylthio group, and p-methoxyphenylthio group), a chelating agent (such as 2,2-thiobis(4-methyl-6-t-butylphenoxy) group), or a halogen atom (such as chlorine, bromine, iodine, or fluorine). $R^5$, $R^6$, $R^7$, and $R^8$ may be the same or different.

As the preferable titanium compound, compounds represented by the general formula (5):

$$Ti\ RXYZ \qquad (5)$$

wherein R represents cyclopentadienyl group, a substituted cyclopentadienyl group, indenyl group, a substituted indenyl group, or a fluorenyl group; X, Y, and Z represents each independently hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms, an alkylamide or arylamide group having 1 to 40 carbon atoms, amino group, or a halogen atom; can be used. The compounds represented by the general formula (5) include compounds in which one of X, Y, and Z and R are crosslinked to each other through $CH_2$ or $SIR_2$. The substituted cyclopentadienyl group represented by R in the general formula is, for example, cyclopentadienyl group substituted with one or more of an alkyl group having 1 to 6 carbon atoms, such as methylcyclopentadienyl group, 1,2-dimethylcyclopentadienyl group, 1,2,4-trimethylcyclopentadienyl group, 1,2,3,4-tetramethylcyclopentadienyl group, trimethylsilylcyclopentadienyl group, 1,3-di(trimethylsilyl)cyclopentadienyl group, tertiary-butylcyclopentadienyl group, 1,3-di(tertiary-butyl)cyclopentadienyl group, and pentamethylcyclopentadienyl group. X, Y, and Z represent each independently hydrogen atom, an alkyl group having 1 to 12 carbon atoms (such as methyl group, ethyl group, propyl group, n-butyl group, isobutyl group, amyl group, isoamyl group, octyl group, and 2-ethylhexyl group), an alkoxy group having 1 to 12 carbon atoms (such as methoxy group, ethoxy group, propoxy group, butoxy group, amyloxy group, hexyloxy group, octyloxy group, and 2-ethylhexyloxy group), an aryl group having 6 to 20 carbon atoms (such as phenyl group and naphthyl group), an aryloxy group having 6 to 20 carbon atoms (such as phenoxy group), an arylalkyl group having 6 to 20 carbon atoms (such as benzyl group), an alkylamide or arylamide group having 1 to 40 carbon atoms (such as dimethylamide group, diethylamide group, diphenylamide group, and methylphenylamide group), or a halogen (such as chlorine, bromine, iodine, and fluorine).

Specific examples of the titanium compound represented by the general formula (5) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,2,4-trimethylcyclopentadienyltrimethyltitanium, 1,2,3,4-tetramethylcyclopentadienyltrimethyltitanium, pentamethylcyclopentadienyl-trimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyl-diethoxytitanium, indenyltitanium trichloride, indenyltitanium trimethoxide, indenyltitanium triethoxide, indenyltrimethyltitanium, indenyltribenzyltitanium, (t-butylamido)dimethyl(tetramethyl-$\eta^5$-cyclopentadienyl)silanetitanium dichloride, (t-butylamido)dimethyl-(tetramethyl-$\eta^5$-cyclopentadienyl) silanetitanium dimethyl, and (t-butylamido)dimethyl(tetramethyl-$\eta^5$-cyclopentadienyl)silanetitanium dimethoxide.

Among these titanium compounds, compounds which do not contain a halogen atom is preferable, and titanium compounds having one π-electronic ligand such as those described above is particularly preferable.

Moreover, a condensed titanium compound represented by the general formula (6):

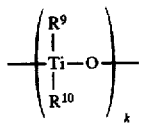

$$(6)$$

wherein $R^9$ and $R^{10}$ represent each a halogen atom, an alkoxy or acyloxy group having 1 to 20 carbon atoms, and k represents 2 to 20, may also be used as the titanium compound. Complex compounds formed from the above titanium compounds and esters or ethers may also be used as the titanium compound.

Typical examples of the trivalent titanium compound represented by the general formula (6) include titanium trihalides, such as titanium trichloride; cyclopentadienyltitanium compounds, such as cyclopentadienyltitanium dichloride; and compounds obtained by reduction of tetravalent titanium compounds. The trivalent titanium compound may be used as a complex formed with an ester or an ether.

Examples of the zirconium compound used as the transition compound include tetrabenzylzirconium, zirconium tetraethoxide, zirconium tetrabutoxide, bisindenylzirconium dichloride, triisopropoxyzirconium chloride, zirconium benzyl dichloride, and tributoxyzirconium chloride. Examples of the hafnium compound used as the transition compound include tetrabenzylhafnium, hafnium tetraethoxide, and hafnium tetrabutoxide. Examples of the vanadium compound used as the transition metal include vanadyl bisacetylacetonate, vanadyl triacetylacetonate, triethoxyvanadyl, and tripropoxyvanadyl. Among these transition metal compounds, titanium compounds are preferable.

As the transition metal compound of the component (a), at least one compound selected from the group consisting of transition metal compounds having two conjugated K-electronic ligands, such as transition metal compounds represented by the general formula (7):

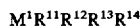

$$M^1 R^{11} R^{12} R^{13} R^{14} \qquad (7)$$

wherein $M^1$ represents titanium, zirconium, or hafnium; $R^{11}$ and $R^{12}$ represent each cyclopentadienyl group, a substituted cyclopentadienyl group, indenyl group, or fluorenyl group; $R^{13}$ and $R^{14}$ represent each hydrogen atom, a halogen atom, a hydrocarbon group having 1 to 20 carbon atoms, an alkoxy group having 1 to 20 carbon atoms, amino group, or a thioalkoxy group having 1 to 20 carbon atoms; and $R^{11}$ and $R^{12}$ may be crosslinked to each other through a hydrocarbon group having 1 to 5 carbon atoms, an alkylsilyl group having 1 to 20 carbon atoms and 1 to 5 silicon atoms, or a germanium-containing hydrocarbon group having 1 to 20 carbon atoms and 1 to 5 germanium atoms; may also be used.

$R^{11}$ and $R^{12}$ in the above general formula (7) represent each cyclopentadienyl group, a substituted cyclopentadienyl group (such as methylcyclopentadienyl group, 1,3-dimethylcyclopentadienyl group, 1,2,4-trimethylcyclopentadienyl group, 1,2,3,4-tetramethylcyclopentadienyl group, pentamethylcyclopentadienyl group, tirmethylsilylcyclopentadienyl group, 1,3-di(trimethylsilyl)cyclopentadienyl group, 1,2,4-tri(trimethylsilyl)cyclopentadienyl group, tertiary-butylcyclopentadienyl group, 1,3-di(tertiary-butyl)cyclopentadienyl group, and 1,2,4-tri(tertiary-butyl)cyclopentadienyl group), indenyl group, a substituted indenyl group (such as methylindenyl group, dimethylindenyl group, and trimethylindenyl group), fluorenyl group, or a substituted fluorenyl group (such as methylfluorenyl group). $R^{11}$ and $R^{12}$ may be the same or different. $R^{11}$ and $R^{12}$ may have a structure in which $R^{11}$ and $R^{12}$ are crosslinked to each other through an alkylidene group having 1 to 5 carbon atoms (such as methine group, ethylidene group, propylidene group, and dimethylcarbyl group), or an alkylsilyl group having 1 to 20 carbon atoms and 1 to 5 silicon atoms (such as dimethylsilyl group, diethylsilyl group, and dibenzylsilyl group). $R^{13}$ and $R^{14}$ represent each an atom or a group described above. More specifically, $R^{13}$ and $R^{14}$ represent each independently hydrogen atom, an alkyl group having 1 to 20 carbon atoms (such as methyl group, ethyl group, propyl group, n-butyl group, isobutyl group, amyl group, isoamyl group, octyl group, and 2-ethylhexyl group), an aryl group having 6 to 20 carbon atoms (such as phenyl group and naphthyl group), an arylalkyl group having 7 to 20 carbon atoms (such as benzyl group), an alkoxy group having 1 to 20 carbon atoms (such as methoxy group, ethoxy group, propoxy group, butoxy group, amyloxy group, hexyloxy group, octyloxy group, and 2-ethylhexyloxy group), an aryloxy group having 6 to 20 carbon atoms (such as phenoxy group), amino group, or a thioalkoxy group having 1 to 20 carbon atoms.

Specific examples of the transition metal compound represented by the general formula (7) include biscyclopentadienyltitanium dimethyl, biscyclopentadienyltitanium diethyl, biscyclopentadienyltitanium dipropyl, biscyclopentadienyltitanium dibutyl, bis(methylcyclopentadienyl)titanium dimethyl, bis(tertiary-butylcyclopentadienyl)titanium dimethyl, bis(1,3-dimethylcyclopentadienyl)titanium dimethyl, bis(1,3-di-tertiary-butylcyclopentadienyl)titanium dimethyl, bis(1,2,4-trimethylcyclopentadienyl)titanium dimethyl, bis(1,2,3,4-tetramethylcyclopentadienyl)titanium dimethyl, biscyclopentadienyltitanium dimethyl, bis(trimethylsilylcyclopentadienyl)titanium dimethyl, bis(1,3-di(trimethylsilyl)cyclopentadienyl)titanium dimethyl, bis(1,2,4-tri(trimethylsilyl)cyclopentadienyl)titanium dimethyl, bisindenyltitanium dimethyl, bisfluorenyltitanium dimethyl, methylenebiscyclopentadienyltitanium dimethyl, ethylidenebiscyclopentadienyltitanium dimethyl, methylenebis(2,3,4,5-tetramethylcyclopentadienyl)titanium dimethyl, ethylidenebis(2,3,4,5-tetramethylcyclopentadienyl)titanium dimethyl, dimethysilylbis(2,3,4,5-tetramethylcyclopentadienyl)titanium dimethyl, methylenebisindenyltitanium dimethyl, ethylidenebisindenyltitanium dimethyl, dimethylsilylbisindenyltitanium dimethyl, methylenebisfluorenyltitanium dimethyl, ethylidenebisfluorenyltitanium dimethyl, dimethylsilylbisfluorenyltitanium dimethyl, methylene(tertiary-butylcyclopentadienyl)(cyclopentadienyl)titanium dimethyl, methylene(cyclopentadienyl)(indenyl)titanium dimethyl, ethylidene(cyclopentadienyl)(indenyl)titanium dimethyl, dimethylsilyl(cyclopentadienyl)(indenyl)titanium dimethyl, methylene(cyclopentadienyl)(fluorenyl)titanium dimethyl, ethylidene(cyclopentadienyl)(fluorenyl)titanium dimethyl, dimethylsilyl(cyclopentadienyl)(fluorenyl)titanium dimethyl, methylene(indenyl)(fluorenyl)titanium dimethyl, ethylidene(indenyl)(fluorenyl)titanium dimethyl, dimethylsilyl(indenyl)(fluorenyl)titanium dimethyl, biscyclopentadienyltitanium dibenzyl, bis(tertiary-butylcyclopentadienyl)titanium dibenzyl, bis(methylcyclopentadienyl)titanium dibenzyl, bis(1,3-dimethylcyclopentadienyl)titanium dibenzyl, bis(1,2,4-trimethylcyclopentadienyl)titanium dibenzyl, bis(1,2,3,4-tetramethylcyclopentadienyl)titanium dibenzyl, bispentamethylcyclopentadienyltitanium dibenzyl, bis(trimethylsilylcyclopentadienyl)titanium dibenzyl, bis(1,3-di(trimethylsilyl)cyclopentadienyl)titanium dibenzyl, bis(1,2,4-tri(trimethylsilyl)cyclopentadienyl)titanium dibenzyl, bisindenyltitanium dibenzyl, bisfluorenyltitanium dibenzyl, methylenebiscyclopentadienyltitanium dibenzyl, ethylidene biscyclopentadienyltitanium dibenzyl, methylenebis(2,3,4,5-tetramethylcyclopentadienyl)titanium dibenzyl, ethylidenebis(2,3,4,5-tetramethylcyclopentadienyl)titanium dibenzyl, dimethylsilylbis(2,3,4,5-tetramethylcyclopentadienyl)titanium dibenzyl, methylenebisindenyltitanium dibenzyl, ethylidenebisindenyltitanium dibenzyl, dimethylsilylbisindenyltitanium dibenzyl, methylenebisfluorenyltitanium dibenzyl, ethylidenebisfluorenyltitanium dibenzyl, dimethylsilylbisfluorenyltitanium dibenzyl, methylene(cyclopentadienyl)(indenyl)titanium dibenzyl, ethylidene(cyclopentadienyl)(indenyl)titanium dibenzyl, dimethylsilyl(cyclopentadienyl)(indenyl)titanium dibenzyl, methylene(cyclopentadienyl)(fluorenyl)titanium dibenzyl, ethylidene(cyclopentadienyl)(fluorenyl)titanium dibenzyl, dimethylsilyl(cyclopentadienyl)(fluorenyl)titanium dibenzyl, methylene(indenyl)(fluorenyl)titanium dibenzyl, ethylidene(indenyl)(fluorenyl)titanium dibenzyl, dimethylsilyl(indenyl)(fluorenyl)titanium dibenzyl, biscyclopentadienyltitanium dimethoxide, biscyclopentadienyltitanium diethoxide, biscyclopentadienyltitanium dipropoxide, biscyclopentadienyltitanium dibutoxide, biscyclopentadienyltitanium diphenoxide, bis(methylcyclopentadienyl)titanium dimethoxide, bis(1,3-dimethylcyclopentadienyl)titanium dimethoxide, bis(1,2,4-trimethylcyclopentadienyl)titanium dimethoxide, bis(1,2,3, 4-tetramethylcyclopentadienyl)titanium dimethoxide, bispentamethylcyclopentadienyltitanium dimethoxide, bis (trimethylsilylcyclopentadienyl)titanium dimethoxide, bis (1,3-di(trimethylsilyl)cyclopentadienyl)titanium dimethoxide, bis(1,2,4-tri(trimethylsilyl)cyclopentadienyl) titanium dimethoxide, bisindenyltitanium dimethoxide, bisfluorenyltitanium dimethoxide, methylenebiscyclopentadienyltitanium dimethoxide, ethylidenebiscyclopentadienyltitanium dimethoxide, methylenebis(2,3,4,5-tetramethylcyclopentadienyl)titanium dimethoxide, ethylidenebis(2,3,4,5-tetramethylcyclopentadienyl)titanium dimethoxide, dimethylsilyl-bis(2,3,4,5-tetramethylcyclopentadienyl) titanium dimethoxide, methylenebisindenyltitanium dimethoxide, methylene-bis(methylindenyl)titanium dimethoxide, ethylidenebisindenyltitanium dimethoxide, dimethylsilylbisindenyltitanium dimethoxide, methylenebisfluorenyltitanium dimethoxide, methylene-bis (methylfluorenyl)titanium dimethoxide, ethylidenebisfluorenyltitanium dimethoxide, dimethylsilylbisfluorenyltitanium dimethoxide, methylene (cyclopentadienyl)(indenyl)titanium dimethoxide, ethylidene(cyclopentadienyl)(indenyl)titanium dimethoxide, dimethylsilyl(cyclopentadienyl)(indenyl) titanium dimethoxide, methylene(cyclopentadienyl) (fluorenyl)titanium dimethoxide, ethylidene (cyclopentadienyl)(fluorenyl)titanium dimethoxide, dimethylsilyl(cyclopentadienyl)(fluorenyl)titanium dimethoxide, methylene(indenyl)(fluorenyl)titanium dimethoxide, ethylidene(indenyl)(fluorenyl)titanium dimethoxide, and dimethylsilyl(indenyl)(fluorenyl)titanium dimethoxide.

Examples of the zirconium compound include ethylidenebiscyclopentadienylzirconium dimethoxide and dimethylsilylbiscyclopentadienylzirconium dimethoxide. Examples of the hafnium compound include ethylidenebiscyclopentadienylhafnium dimethoxide and dimethylsilylbiscyclopentadienylhafnium dimethoxide. Among these compounds, the titanium compounds are particularly preferable.

Specific examples of the transition metal compound further include bidentate coordinated complexes, such as 2,2'-thiobis(4-methyl-6-t-butylphenoxy)titanium isopropoxide and 2,2'-thiobis(4-methyl-6-t-butylphenoxy)titanium dimethoxide, as well as combinations of the compounds described above.

As the coordinated complex compound composed of a cation and an anion in which a plurality of groups are connected to a metal of the component (b) used in the catalyst for polymerization of the present invention, various compounds can be used. For example, a compound represented by the following general formula (8) or (9):

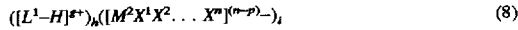 (8)

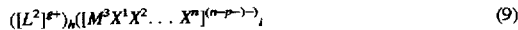 (9)

can advantageously be used. In the above general formulae (8) and (9), $L^2$ represents $M^4$, $T^1T^2M^5$, or $T^3{}_3C$ which are described below; $L^1$ represents a Lewis base; $M^2$ and $M^3$ represent each a metal selected from the elements of Groups 5 to 15 of the Periodic Table; $M^4$ represents a metal selected from the elements of 8 to 12 of the Periodic Table; $M^5$ represents a metal selected from the elements of Group 8 to 10 of the Periodic Table; $X^1$ to $X^n$ represent each hydrogen atom, a dialkylamino group, an alkoxy group, an aryloxy group, an alkyl group having 1 to 20 carbon atoms, an aryl group, an alkylaryl group, or an arylalkyl group having 6 to 20 carbon atoms, a substituted alkyl group, a substituted aryl group, an organometalloid group, or a halogen atom; $T^1$ and $T^2$ represent each cyclopentadienyl group, a substituted cyclopentadienyl group, indenyl group, or fluorenyl group; $T^3$ represents an alkyl group; p represents the valency of $M^2$ or $M^3$ which is an integer of 1 to 7; n represents an integer of 2 to 8; g is a number of charge of the ion $L^1$—H or $L^2$ which is an integer of 1 to 7; h is an integer of 1 or more; and i=h×g/(n-p).

Specific examples of $M^2$ and $M^3$ include atoms of B, Al, C, Si, P, As, and Sb. Specific examples of $M^4$ include atoms of Ag and Cu. Specific examples of $M^5$ include atoms of Fe, Co, and Ni. Specific examples of $X^1$ to $X^n$ include dialkylamino groups, such as dimethylamino group and diethylamino group; alkoxy groups, such as methoxy group, ethoxy group, and n-butoxy group; aryloxy groups, such as phenoxy group, 2,6-dimethylphenoxy group, and naphthyloxy group; alkyl groups having 1 to 10 carbon atoms, such as methyl group, ethyl group, n-propyl group, isopropyl group, n-butyl group, moctyl group, and 2-ethylhexyl group; aryl groups, alkylaryl groups, and arylalkyl groups having 6 to 20 carbon atoms, such as phenyl group, p-tolyl group, benzyl group, pentafluorophenyl group, 3,5-di (trifluoromethyl)phenyl group, 4-tertiary-butylphenyl group, 2,6- dimethylphenyl group, 3,5-dimethylphenyl group, 2,4-dimethylphenyl group, and dimethylphenyl group; halogens, such as F, Cl, Br, and I; and organometalloid groups, such as pentamethylstibine group, trimethylsilyl group, trimethylgermyl group, diphenylarsine group, dicyclohexylstibine group, and diphenylboron group. Specific examples of the substituted cyclopentadienyl group represented by $T^1$ or $T^2$ include methylcyclopentadienyl group, butylcyclopentadienyl group, and pentamethylcyclopentadienyl group.

Among the compounds represented by the general formula (8) or (9), more specifically, the following compounds can be used particularly preferably. Examples of the compound represented by the general formula (8) include triethylammonium tetraphenyl borate, tri(n-butyl)ammonium tetraphenyl borate, trimethylammonium tetraphenyl borate, triethylammonium tetra(pentafluorophenyl) borate, tri(n-butyl)ammonium tetra(pentafluorophenyl) borate, triethylammonium hexafluoroarsenate, pyridinium tetra (pentafluorophenyl) borate, pyrrolinium tetra (pentafluorophenyl) borate, N,N-dimethylanilinium tetra (pentafluorophenyl) borate, and methyldiphenylammonium tetra(pentafluorophenyl) borate. Examples of the compound represented by the general formula (9) include ferrocenium tetraphenyl borate, dimethylferrocenium tetra (pentafluorophenyl) borate, ferrocenium tetra (pentafluorophenyl) borate, decamethylferrocenium tetra (pentafluorophenyl) borate, acetylferrocenium tetra (pentafluorophenyl) borate, formylferrocenium tetra (pentafluorophenyl) borate, cyanoferrocenium tetra (pentaflurophenyl) borate, silver tetraphenyl borate, silver tetra(pentafluorophenyl) borate, triphenylmethyl tetraphenyl borate, triphenylmethyl tetra(pentafluorophenyl) borate, silver hexafluoroarsinate, silver hexafluoroantimonate, and silver tetrafluoroborate.

As the component (b), an aluminoxane as well as the coordinated complex compound composed of a cation and an anion in which a plurality of groups are connected to a metal can be used. The aluminoxane is a compound obtained by bringing various types of organoaluminum compound into contact with a condensation agent. As the organoaluminum compound used as the starting material of the reaction, an organoaluminum compound represented by the general formula (10):

$$AlR^{15}{}_3 \tag{10}$$

wherein $R^{15}$ represents an alkyl group having 1 to 8 carbon atoms, is generally used. Specific examples of the organoaluminum compound represented by the general formula (10) include trimethylaluminum, triethylaluminum, and triisobutylaluminum. Among these compounds, trimethylaluminum is most preferable. As the condensation agent which is used for condensation with the organoaluminum compound, typically, water is used. However, any compound which makes condensation reaction with an organoaluminum compound can also be used. Examples of the aluminoxane include linear alkylaluminoxanes represented by the general formula (11):

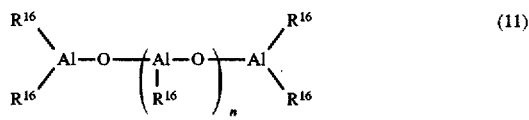

wherein n represents the degree of polymerization which is a member of 2 to 50, and $R^{16}$ represents an alkyl group having 1 to 8 carbon atoms, and cyclic alkylaluminoxanes having a repeating unit represented by the general formula (12):

wherein $R^{16}$ is the same as that described above. Among these aluminoxanes, compounds represented by the general formula (11) or (12) in which $R^{16}$ represents methyl group, i.e. methylaluminoxane, are particularly preferable. The reaction product of an alkylaluminum compound, such as a trialkylaluminum, and water generally contains the linear alkylaluminoxanes and the cyclic alkylaluminoxanes described above, the residual trialkylaluminum, a mixture of various types of condensation products, and species formed by association of these compounds in a complicated manner. Various types of reaction product are obtained depending on the conditions under which the alkylaluminum compound and water are brought into contact with each other. The process for the reaction of a trialkylaluminum and water is not particularly limited, and the reaction may be conducted in accordance with a conventional process.

The catalyst for polymerization used in the present invention may additionally comprise an alkylating agent of the component (c) if desired. As the alkylating agent, various compounds can be used. Examples of the alkylating agent include an aluminum compound containing alkyl group represented by the general formula (13):

$$R^{17}{}_m Al(OR^{18})_n X_{3-m-n} \tag{13}$$

wherein $R^{17}$ and $R^{18}$ represent each an alkyl group having 1 to 8 carbon atoms, preferably 1 to 4 carbon atoms, X represents hydrogen or a halogen, m is in the range of $0 < m \leq 3$, preferably 2 or 3, most preferably 3, and n is in the range of $0 \leq n < 3$, preferably 0 or 1; a magnesium compound containing alkyl group represented by the general formula (14):

$$R^{17}{}_2 Mg \tag{14}$$

wherein $R^{17}$ is the same as that described above; and a zinc compound containing alkyl group represented by the general formula (15):

$$R^{17}{}_2 Zn \tag{15}$$

wherein $R^{17}$ is the same as that described above.

Among the metal compounds containing alkyl group described above, aluminum compounds containing alkyl group, particularly trialkylaluminums and dialkylaluminum compounds, are preferable. Specific examples of the metal compound containing alkyl group include trialkylaluminums, such as trimethylaluminum, triethylaluminum, tri-n-propylaluminum, triisopropylaluminum, tri-n-butylaluminum, triisobutylaluminum, and tri-t-butylaluminum; dialkylaluminum halides, such as dimethylaluminum chloride, diethylaluminum chloride, di-n-propylaluminum chloride, diisopropylaluminum chloride, di-n-butylaluminum chloride, diisobutylaluminum chloride, and di-t-butylaluminum chloride; dialkylaluminum alkoxides, such as dimethylaluminum methoxide and dimethylaluminum ethoxide; and dialkylaluminum hydrides, such as dimethylaluminum hydride, diethylaluminum hydride, and diisobutylaluminum hydride. Further examples of the metal compounds containing alkyl group include dialkylmagnesims, such as dimethylmagnesium, diethylmagnesium, di-n-propylmagnesium, and diisopropylmagnesium; and dialkylzincs, such as dimethylzinc, diethylzinc, di-n-propylzinc, and diisopropylzinc. Particularly, aluminum compounds containing alkyl group in which the alkyl group is a branched alkyl group are preferably used.

The catalyst for polymerization used in the present invention generally comprises the components (a) and (b) and/or the component (c) described above. For the preparation of the catalyst, various processes may be used. For example, the components may be added to a monomer in any order, or a monomer may be added to the reaction product of the catalyst components.

The components (a), (b), and (c) may be added to a reaction system or may be brought into contact with each other not only at the temperature of polymerization, but also at a temperature of 0° to 100° C. The order of the addition or the contact with each other of the components (a), (b), and (c) is not particularly limited.

The above-described catalyst exhibits a high activity in the production of a styrenic polymer having a highly syndiotactic configuration.

In the present invention, an organometallic compound is added in the process for polymerization of a styrenic compound using the catalyst for polymerization described above. As the organometallic compound, an organometallic compound in which the metal component is a metal belonging to Group 12 or 13 of the Periodic Table can be used.

The organometallic compound is preferably a compound containing one or more alkyl groups having 4 or less carbon atoms, particularly preferably a compound containing Al or Zn as the metal component and one or more alkyl groups having 4 or less carbon atoms. More specific examples of the organometallic compound include organoaluminum compounds, such as $(CH_3)_3Al$, $(CH_3)_2AlCl$, $(C_2H_5)_3Al$, $(C_2H_5)_2AlH$, $(C_2H_5)_2AlCl$, $(C_2H_5)AlOC_2H_5$, $C_2H_5AlCl_2$, $(i\text{-}C_4H_9)_2AlH$, $(C_3H_7)_3Al$, and $(C_4H_9)_3Al$; and organozinc compounds, such as $(C_2H_5)_2Zn$. Among the organometallic compounds, organometallic compounds in which the alkyl group is a linear alkyl group are preferably used.

The compounds the same as those described for the component (c) of the catalyst for polymerization in the above are also used as the organometallic compound.

In the process of the present invention, the organometallic compound is added in an amount of 200 times or less, preferably 100 times or less, the mol of the transition metal compound in the catalyst for polymerization to prepare a crystalline styrenic polymer. When the amount is more than 200 times the mol of the transition metal, the catalyst activity is decreased.

The process for adding the organometallic compound is not particularly limited, and (i) a process in which the components (a), (b), and (c) described above are mixed well in advance, and the organometallic compound described above is added to the resultant mixture before adding a styrenic monomer to the mixture; (ii) a process in which the components (a), (b), and (c) are mixed with each other with any order, and the organometallic compound is added to the resultant mixture before adding a styrenic monomer to the mixture; (iii) a process in which, after the components of the catalyst are mixed with each other, the organometallic compound is added to the resultant mixture as a mixture with a monomer; and (iv) a process in which, immediately after a monomer is placed in the reactor, the organometallic compound is added to the monomer, thereafter the catalyst components are added to the resultant mixture; can be used. Among these processes, the process (i) or (ii) is preferably used.

The organometallic compound described above may be added to the reaction mixture at an ordinary temperature or at a temperature elevated to some extent.

For producing a styrenic polymer in accordance with the process of the present invention, a styrenic monomer, such as styrene and/or a styrene derivative (such as an alkylstyrene, an alkoxystyrene, a halogenated styrene, and a vinylbenzoic acid ester), is polymerized (or copolymerized) in the presence of a catalyst for polymerization comprising the components (a), (b) and (c) as the main components thereof and an organometallic compound.

The polymerization of the styrenic monomer may be conducted in accordance with the bulk polymerization or in a solvent, such as an aliphatic hydrocarbon such as pentane, hexane, and heptane, an alicyclic hydrocarbon such as cyclohexane, or an aromatic hydrocarbon such as benzene, toluene, and xylene. The temperature of polymerization is not particularly limited, and generally selected in the range of $-20°$ to $120°$ C., preferably in the range of $40°$ to $100°$ C.

The styrenic polymer obtained as described above has a highly syndiotactic configuration. The highly syndiotactic configuration of the styrenic polymer means that the stereochemical structure has a highly syndiotactic configuration. In other words, phenyl groups and substituted phenyl groups of the side groups are alternately placed at the opposite positions with respect to the main chain formed with the carbon—carbon bond. The tacticity in the stereochemical structure is quantitated by the measurement of the nuclear magnetic resonance using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic (co) polymer having a highly syndiotactic configuration" means polystyrene, a poly(alkylstyrene), a poly(halogenated styrene), a poly(alkoxystyrene), a poly(vinylbenzoic acid ester), a mixture of these polymers, or a copolymer containing constituting units of these polymers as the main components, which generally has a syndiotacticity of 75% or more, preferably 85% or more, expressed in terms of the content of the racemic diad, or 30% or more, preferably 50% or more, expressed in terms of the content of the racemic pentad. Examples of the poly(alkylstyrene) include poly (methystyrene), poly(ethylstyrene), poly(isopropylstyrene), and poly(tertiary-butylstyrene). Examples of the poly (halogenated styrene) include poly(chlorostyrene), poly (bromostyrene), and poly(fluorostyrene). Examples of the poly(alkoxystyrene) include poly(methoxystyrene) and poly (ethoxystyrene). Preferable examples of the styrenic polymers among these styrenic polymers are polystyrene, poly (p-methylstyrene), Poly(m-methylstyrene), poly(p-tertiary-butylstyrene), poly(p-chlorostyrene), poly(m-chlorostyrene), poly(p-fluorostyrene), and copolymers of styrene and p-methylstyrene.

The styrenic polymer prepared in accordance with the process of the present invention has the crystallinity. The molecular weight of the polymer can be adjusted to a desired value by suitably selecting the type and the amount of the organometallic compound. However, the styrenic polymer generally has a weight-average molecular weight of 10,000 to 3,000,000, preferably 100,000 to 1,500,000, a number-average molecular weight of 5,000 to 1,500,000, preferably 50,000 to 1,000,000, and a high syndiotacticity as described above. After the polymerization, if necessary, the reaction product is treated with a washing fluid containing hydrochloric acid or the like to remove ashes, further washed, dried under a vacuum, and washed with a solvent such as methyl ethyl ketone to remove soluble fractions. By treating the remaining insoluble fraction with chloroform or the like, a crystalline styrenic polymer which has a very high syndiotacticity and a high purity can be obtained.

The crystalline styrenic polymer having a very high syndiotacticity has a melting point of $160°$ to $310°$ C., and exhibit remarkably superior heat resistance to that of conventional styrenic polymers having the atactic configuration.

The present invention is described in more detail with reference to examples in the following. However, the present invention is not limited by the examples.

EXAMPLE 1

To a catalyst system prepared from triisobutylaluminum as the component (c), dimethylanilinium tetra (pentafluorophenyl) borate as the component (b), and pentamethylcyclopentadienyltitanium trimethoxide as the component (a), triethylaluminum as the organometallic compound (occasionally referred to as X) was added. Styrene (occasionally referred to as SM) was polymerized in the presence of the resultant mixture (conversion=35%). For the polymerization, the materials were mixed in the following ratio by mol:SM:X:the component (c):the component (b):the component (a)=350000:25:20:1:1. The polymerization was conducted at $70°$ C. for 1 hour. The obtained polymer was finely pulverized, thoroughly washed with methanol, and dried under a vacuum. The resultant polymer was extracted with methyl ethyl ketone as the solvent using a Soxhlet extractor for 6 hours. The content of the obtained insoluble fraction was 98%. This fraction had a weight-average molecular weight of 390,000.

In the present Description, the weight-average molecular weight was obtained by the measurement of the gel permeation chromatography and the calculation using a calibration curve obtained from standard samples of polystyrene.

EXAMPLE 2

Polymerization was conducted in accordance with the same procedures as those in Example I except that triethylaluminum in an amount 200 times the amount of the component (a) was used as the organometallic compound. The conversion was 25%, and the weight-average molecular weight of the polymer was 130,000.

EXAMPLE 3

To a catalyst system prepared from triisobutylaluminum as the component (c), methylaluminoxane as the component (b), and pentamethylcyclopentadienyltitanium trimethoxide as the component (a), triethylaluminum as the organometallic compound was added. Styrene was polymerized in the presence of the resultant mixture (conversion=35%). For the polymerization, the materials were mixed in the following mol ratio:SM:X:the component (c): the component (b) the component (a)=350000:25:25:75:1. The polymerization was conducted at 70° C. for 1 hour. The obtained polymer was finely pulverized, thoroughly washed with methanol, and dried under a vacuum. The resultant polymer was extracted with methyl ethyl ketone as the solvent using a Soxhlet extractor for 6 hours. The content of the obtained insoluble fraction was 97%. This fraction had a weight-average molecular weight of 370,000.

EXAMPLE 4

Polymerization was conducted in accordance with the same procedures as those in Example 3 except that tri-normal-propylaluminum was used as the organometallic compound. The conversion was 21%, and the weight-average molecular weight of the obtained SPS was 730,000.

EXAMPLE 5

Polymerization was conducted in accordance with the same procedures as those in Example 3 except that tri-normal-butylaluminum was used as the organometallic compound. The conversion was 20%, and the weight-average molecular weight of the obtained SPS was 720,000.

EXAMPLE 6

Polymerization was conducted in accordance with the same procedures as those in Example 3 except that diethylaluminum hydride was used as the organometallic compound in such an amount that the ratio by mol to the component (a) was 100. The conversion was 25%, and the weight-average molecular weight of the obtained SPS was 170,000.

EXAMPLE 7

Polymerization was conducted in accordance with the same procedures as those in Example 3 except that diethylaluminum ethoxide was used as the organometallic compound in such an amount that the ratio by mol to the component (a) was 20. The conversion was 27%, and the weight-average molecular weight of the obtained SPS was 710,000.

EXAMPLE 8

Polymerization was conducted in accordance with the same procedures as those in Example 3 except that diethylzinc was used as the organometallic compound in such an amount that the ratio by mol to the Component (a) was 5. The conversion was 25%, and the weight-average molecular weight of the obtained SPS was 730,000.

EXAMPLE 9

Polymerization was conducted in accordance with the same procedures as those in Example 3 except that trimethylaluminum was used as the organometallic compound in such an amount that the ratio by mol to the component (a) was 100 in place of triethylaluminum which was used in such an amount that the ratio by mol to the component (a) was 25. (The ratio by mol of the materials is as follows: SM:X:the component (c):the component (b):the component (a)=350000:100:25:75:1.) The conversion was 21%, and the weight-average molecular weight of the obtained SPS was 580,000.

COMPARATIVE EXAMPLE 1

Polymerization was conducted in accordance with the same procedures as those in Example 1 except that triethylaluminum as the organometallic compound was not used. The conversion was 41%, and the weight-average molecular weight of the obtained SPS was 1,030,000.

COMPARATIVE EXAMPLE 2

Polymerization was conducted in accordance with the same procedures as those in Example 1 except that triethylaluminum was used as the organometallic compound in such an amount that the ratio by mol to the component (a) was 300. The conversion decreased extremely to 9%, and the weight-average molecular weight of the obtained SPS was 80,000.

The type and the amount of the organometallic compound used in Examples and Comparative Examples, the conversion, and the molecular weight of the formed SPS are shown in Table 1.

TABLE 1

| | organometallic compound | added amount (ratio by mol) | conversion (%) | molecular weight × $10^4$ |
|---|---|---|---|---|
| Example 1 | triethylaluminum | 25 | 35 | 39 |
| Example 2 | triethylaluminum | 200 | 25 | 13 |
| Example 3 | triethylaluminum | 25 | 37 | 37 |
| Example 4 | tri-n-propylaluminum | 25 | 21 | 73 |
| Example 5 | tri-n-butylaluminum | 25 | 20 | 72 |
| Example 6 | diethylaluminum hydride | 100 | 25 | 17 |
| Example 7 | diethylaluminum ethoxide | 20 | 27 | 71 |
| Example 8 | diethylzinc | 5 | 25 | 73 |
| Example 9 | trimethylaluminum | 100 | 21 | 58 |
| Comparative Example 1 | none | 0 | 41 | 103 |
| Comparative Example 2 | triethylaluminum | 300 | 9 | 8 |

INDUSTRIAL APPLICABILITY

As described above, in accordance with the process of the present invention, the molecular weight of a high quality crystalline styrenic polymer which has a highly syndiotactic configuration and contains the atactic configuration only in a small amount can easily be controlled without causing decrease in the catalyst activity.

A styrenic polymer having a highly syndiotactic configuration can efficiently be obtained by homopolymerizing or copolymerizing a styrenic compound in accordance with the process of the present invention. Therefore, the process of the present invention is expected to be advantageously used for producing the styrenic polymer.

We claim:

1. A process for preparing a styrenic polymer, comprising:
polymerizing a vinyl aromatic monomer in the presence of a catalyst comprising
   (a) a transition metal compound;
   (b) (b1) an aluminoxane; or
   (b2) a coordinated complex compound composed of a cation and an anion in which a plurality of groups are connected to a metal;
   (c) an alkylating agent; and
   (d) at least one organometallic compound selected from the group consisting of triethylaluminum, diethylaluminum halide, diethylaluminum ethoxide and diethylzinc;
wherein said alkylating agent and said organometallic compound are different compounds.

2. The process according to claim 1, wherein said styrenic polymer has a syndiotactic configuration.

3. The process according to claim 2, wherein said transition metal compound, component (a), is represented by the formulas (1) or (2):

 (2)

 (2)

wherein M represents a metal of Groups 3 to 6 of the Periodic Table or a metal of the lanthanide series of the Periodic Table; $R^1$, $R^2$, $R^3$, and $R^4$ represent each an alkyl group, an alkoxy group, an aryl group, a cyclopentadienyl group, a substituted cyclopentadienyl group, an alkylthio group, an indenyl group, a substituted indenyl group, a fluorenyl group, a halogen atom, an amino group, or a chelating agent; a, b, and c, represent each an integer of 0 to 4; and d and e represent each an integer of 0 to 3.

4. The process according to claim 3, wherein M is Ti.

5. The process according to claim 2, wherein said transition metal compound, component (a), is represented by the formulas (3) or (4):

 (3)

 (4)

wherein $R^5$, $R^6$, $R^7$, and $R^8$ represent each a hydrogen atom, an alkyl group having 1 to 20 carbon atoms, an alkoxy group having 1 to 20 carbon atoms, an aryl group, an alkylaryl group, or an arylalkyl group having 6 to 20 carbon atoms, an acyloxy group having 1 to 20 carbon atoms, a cyclopentadienyl group, a substituted cyclopentadienyl group, an indenyl group, a substituted indenyl group, a fluorenyl group, an alkylthio group, an arylthio group, an amino group, a chelating agent, or a halogen atom; a, b, and c represent each an integer of 0 to 4; d and e represent each an integer of 0 to 3.

6. The process according to claim 2, wherein said alkylating agent, component (c), is an aluminum compound containing an alkyl group represented by the formula (13):

 (13)

wherein $R^{17}$ and $R^{18}$ represent each an alkyl group having 1 to 8 carbon atoms; X represents hydrogen or a halogen; m is in the range of $0<m\leq3$; and n is in the range of $0\leq n<3$.

7. The process according to claim 2, wherein said alkylating agent, component (c), is a triisobutylaluminum.

8. The process according to claim 1, wherein said organometallic compound is triethylaluminum.